United States Patent [19]
Festa

[11] Patent Number: 4,480,153
[45] Date of Patent: Oct. 30, 1984

[54] MUSICAL-OUTPUT ADAPTER FOR TELEPHONES

[76] Inventor: Lawrence M. Festa, 238 Cajon St., Laguna Beach, Calif. 92651

[21] Appl. No.: 481,723

[22] Filed: Apr. 4, 1983

[51] Int. Cl.³ .............................................. H04M 11/02
[52] U.S. Cl. .................................. 179/84 T; 179/84 R
[58] Field of Search ................. 179/84 T, 84 R, 99 H; 340/384 E

[56] References Cited

U.S. PATENT DOCUMENTS 4,251,694  2/1981  Taylor .............................. 179/84 T

OTHER PUBLICATIONS

Cornford, "Musical Phone Bell", Electronic Engineering, Aug. 1981, p. 19.

Georgiou, "High Isolation Ringer Replacement", Electronic Engineering, Jan. 1979, p. 17.

Dugan, "Ringer Enables Telephone to Play Simple Tune", Electronics, May 15, 1975, p. 115.

*Primary Examiner*—A. D. Pellinen
*Assistant Examiner*—James L. Dwyer
*Attorney, Agent, or Firm*—Francis X. LoJacono

[57] ABSTRACT

A musical apparatus for use with a telephone so as to replace the ringing of the bell by providing a musical tune or melody when the telephone is activated by a caller. The apparatus includes a musical-output circuit, a speaker, and a coded control panel for selecting one of the many programmed tunes or melodies that play for a given length of time until the phone is either answered or the caller hangs up.

11 Claims, 4 Drawing Figures

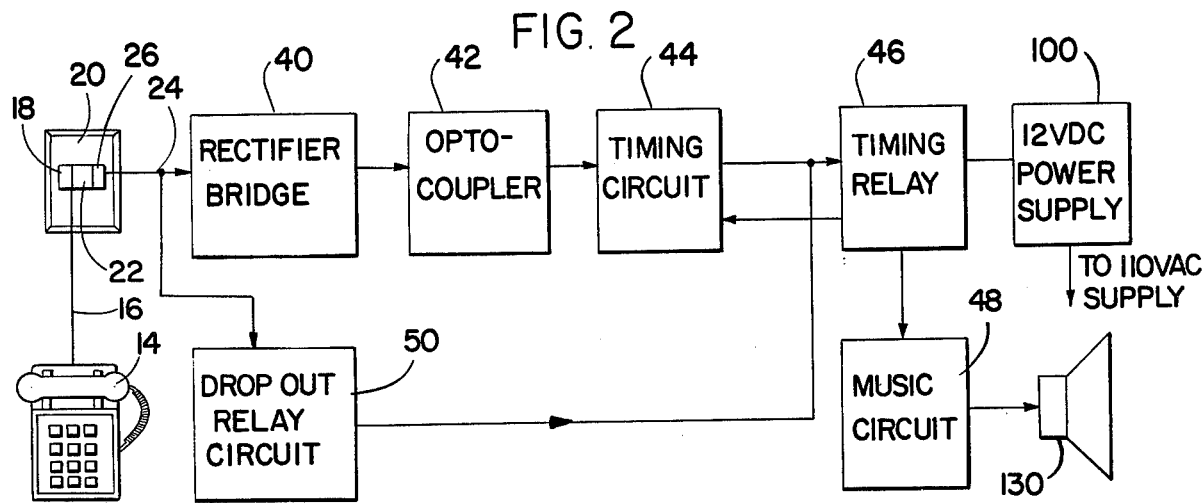
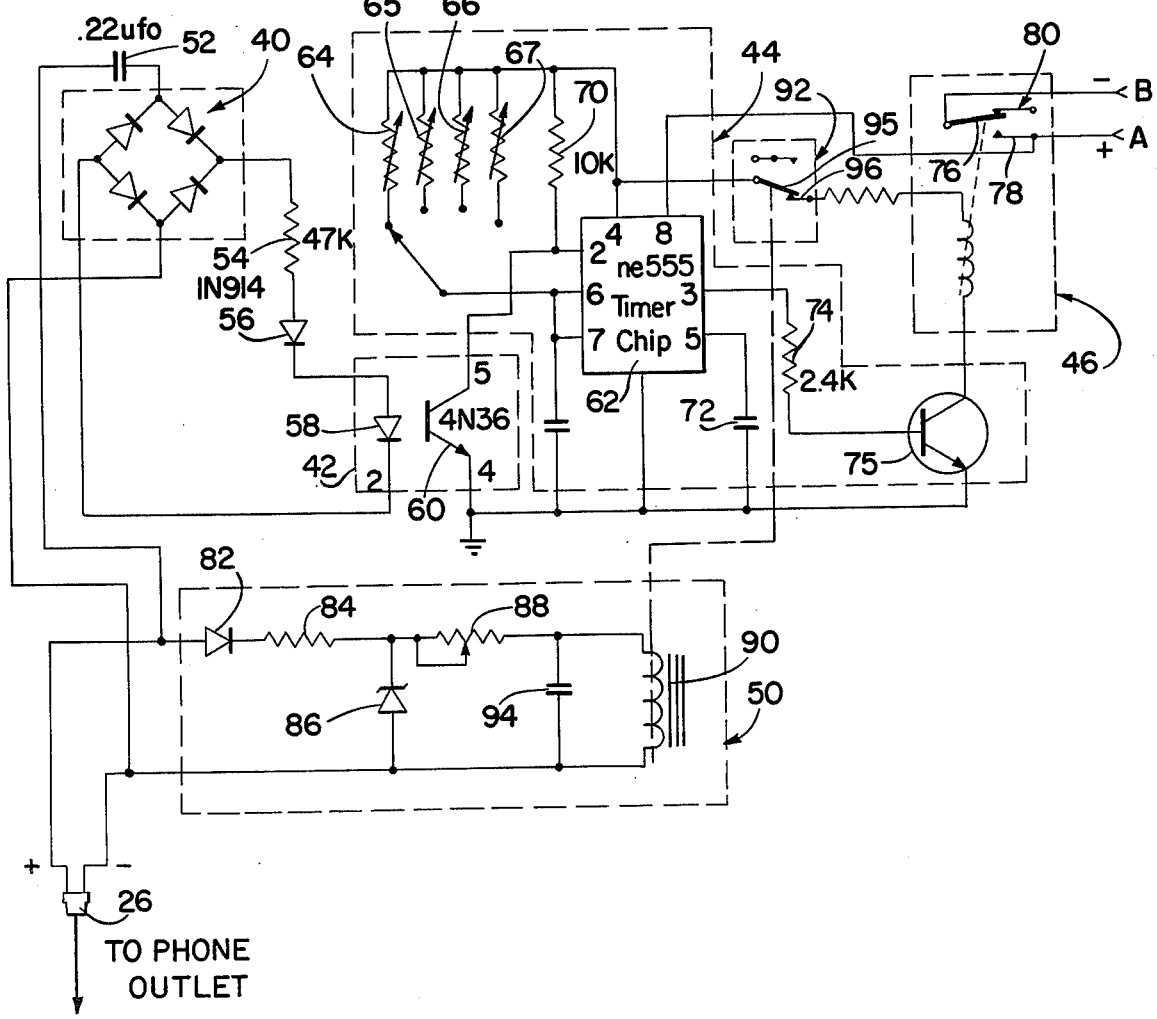

MUSICAL-OUTPUT ADAPTER FOR TELEPHONES

BACKGROUND OF THE INVENTION

This invention relates generally to telephone accessories and the like, and more particularly to a musical-output adapter for telephones to be used in place of the ringing bell or in conjunction therewith.

As is well known, when a telephone is installed it is usually of the type provided with a bell that can be adjusted to ring loudly or softly, as desired. There are other types of sound devices providing the resonant tone of a gong. Thus, once any one of the above sound devices is employed, it can be controlled only for the degree of loudness. Hence, one can adjust for either a loud ring or gong, or a soft ring or gong.

Accordingly, there is a need for a sound device that allows one to not only control the volume of the sound produced when a phone rings, but allows one to also select one of a number of sounds or tones.

SUMMARY OF THE INVENTION

The present invention has for an important object to provide a device wherein a plurality of musical tones or melodies are presented for selective playing in place of a bell or gong when a telephone is activated to ring.

Another object of the invention is to provide a musical-output apparatus which is installed in conjunction with any telephone by means of an appropriate adapter, the device being employed in place of the telephone's bell.

Still another object of the invention is to provide a musical-output apparatus that is simply connected to the outlet plug together with the telephone, so as to receive the activating signal of the telephone when it is to ring.

A further object of the invention is to provide a musical-output apparatus having a musical-output circuit, a speaker, and a music selector for choosing one of a number of tunes or melodies that will play for a given length of time in place of the ringing bell, until the phone is either answered or the caller hangs up.

A still further object of the present invention is to provide an apparatus of this character that is readily connected or disconnected to the typical phone jack, wherein the apparatus itself comprises a box-like container including therein a rectifier bridge, an opto-coupler, a timing circuit, a timing relay, a 12 volt DC power supply adapted to be connected to a 110 volt AC supply, a music circuit, a drop-out relay circuit, and a small speaker.

It is a further object of the invention to provide an apparatus of this character that is simple to operate and has relatively few operating parts.

It is still a further object of the invention to provide an apparatus of this type that is easy to service and maintain, and is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 2 is a box diagram showing a representative system embodying the present invention, including a telephone coupled thereto; and FIGS. 3A and 3B illustrate the wiring diagram of the present invention.

DESCRIPTION OF THE PREFERRED EMBODIMENT

Figure 1:
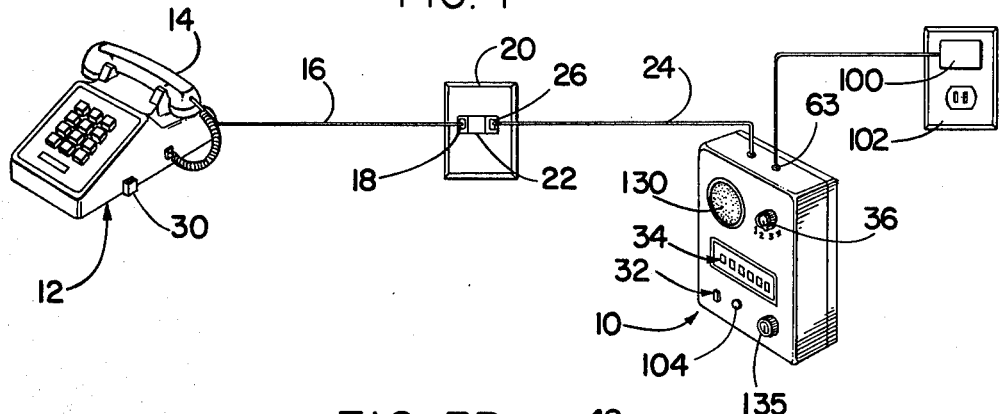
FIG. 1 is a diagrammatical pictorial view of a telephone having the present invention connected thereto in a typical operational arrangement.

Referring more particularly to FIG. 1, there is shown a typical layout of the hookup of the present invention, the musical-output apparatus generally indicated at 10, with a typical telephone unit, designated at 12. The well-known telephone unit 12 includes the usual handheld receiver 14. When a phone call is made to a particular number, the telephone unit at the receiving end is activated so as to ring the enclosed bell until receiver 14 is raised from its cradle or when the caller hangs up.

Generally a telephone unit, such as at 12, is provided with a connecting line 16 having a jack 18 that is normally coupled to wall plug or outlet 20. Thus, when the present musical unit or apparatus 10 is to employed in place of the telephone's bell, a dual-connector plug 22 is coupled first to the outlet 20; this allows both the telephone 12 and the musical unit 10 to be connected to the main incoming telephone line. Consequently, musical unit 10 includes a connecting line 24 having a jack 26 which couples to plug 22 so as to receive the necessary signal (voltage) from an incoming call.

For the musical unit to properly operate, the bell (not shown) in the telephone is either disconnected or is provided with a silencer 30 (such as manufactured by Radio Shack under Cat. No. 43-125). After the musical unit is connected as described, a 12 volt DC power-supply adapter 100 is plugged into a 110 volt AC outlet 102, as shown in FIG. 1. At this time, a musical selection is made for the particular melody or tune to be played in place of the ring.

Accordingly, a chart is provided which lists a multiplicity of tunes or melodies which are coded by a suitable means, such as the use of the numerals 0 and 1 in various combinations in the form of six-digit columns—for example, 000001, 000011, etc. For each column, there is provided a selector switch 34. One then merely selects the proper switch relating to the coded number for a particular tune.

After the selection is made, mode switch 36 is positioned as required, each code being provided with a specific mode arrangement, from 1 to 4. That is, each tune is given a specific time to play a given number of musical notes, so that the basic melody is recognized as it is played. The timing sequence for repeat play of the melody is also controlled. The tune will continually repeat itself in the same manner as with the ringing of the bell.

Referring now to the box diagram of FIG. 2, there is shown telephone 12 connected by line 16 to wall outlet 20 by means of plug 22 and jack 12, as previously described, the jack 26 also being connected to plug 22 which has line 24 interconnected to musical unit 10.

When telephone 12 is activated, 90 volts AC at 20 cycles are at this time present on the incoming line at telephone outlet 20. The AC voltage passes through the bridge rectifier 40 which changes the 20 cycles, 90-volts AC current to a direct current DC voltage so as to feed the opto-coupler 42. The opto-coupler is a means of optically coupling the telephone line to the remaining circuit in use. This arrangement allows for a separate power supply to be used so as not to drain or overload the existing telephone line.

From the opto-coupler 42, current passes through a timing circuit 44 which is activated by the ringing cycle. The ringing cycle is predetermined and set by the local telephone company. A ringing cycle is generally the length of time of each ring of the bell, and the length of time between rings. The timing circuit will shut down at a predetermined period of time. The predetermined period for shut-down will vary according to the particular mode indicated by mode switch 36 which is part of the timing circuit 44. Timing circuit 44 then activates the timing relay 46 which acts as a switch means to activate the music circuit 48—the music circuit having a digital, programmable, sound-synthesizer means which is programmed to provide a multiplicity of tunes and/or melodies, whereby any one of the programmed tunes can be preselected to play while receiver 14 is in its cradle.

Accordingly, when the telephone is answered (receiver 14 is lifted from its cradle), the drop-out relay circuit 50 having a normally closed switch opens to disconnect the timing relay 46, which in turn switches off (disconnects) the music circuit 48, at which time music stops playing. Thus, the selected tune will continue to play and repeat itself from the time the telephone is activated by the caller until the receiver is lifted from its cradle, or the caller hangs up.

Figure 3B:
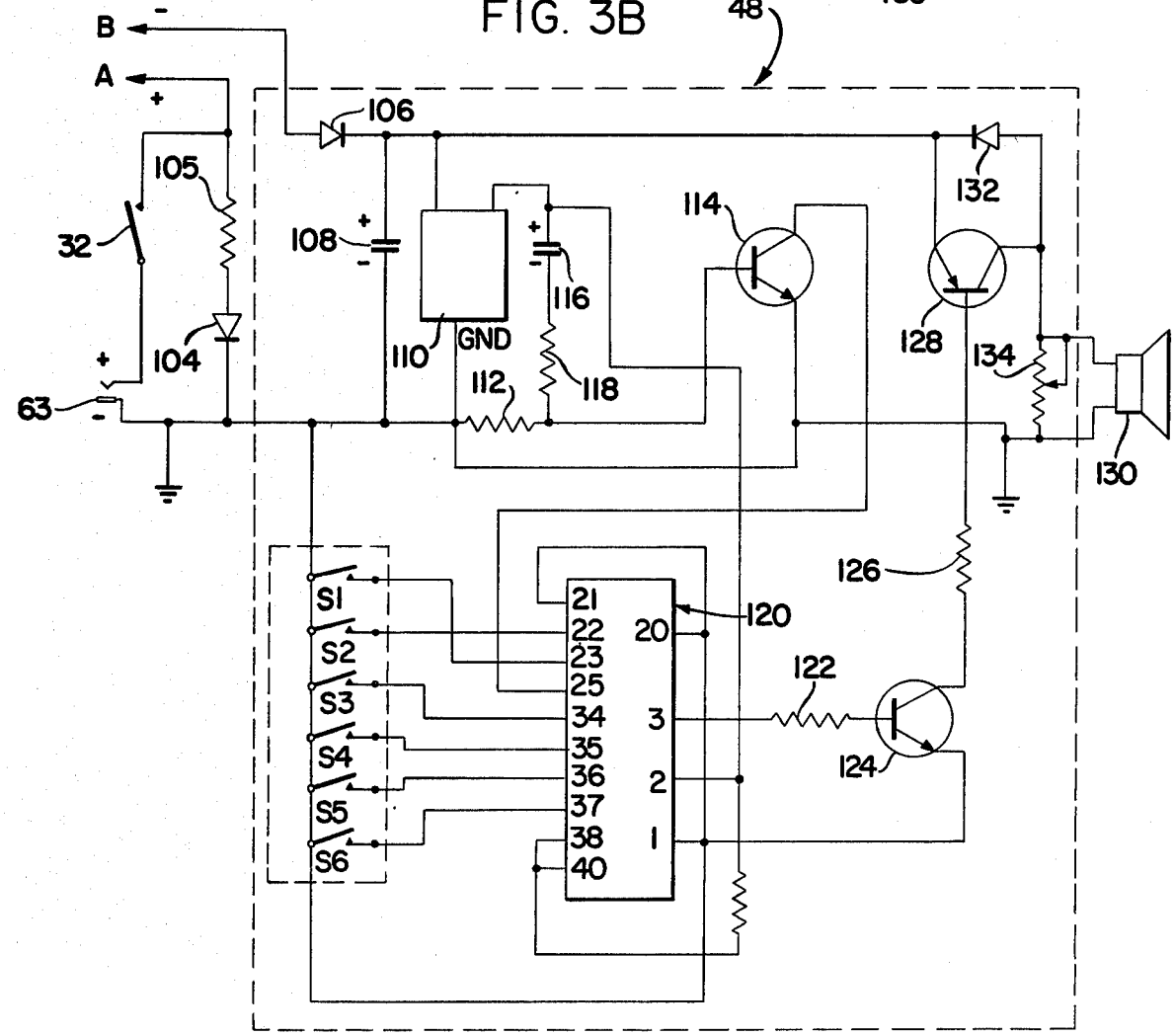

The following is a detailed description of the electronic circuitry as illustrated in FIGS. 3A and 3B. When telephone 12 is not in use (that is, not activated to ring), the line voltage from the telephone-plug outlet 20 is approximately 48 volts DC. However, when the telephone is activated to a ringing-mode signal by someone calling the particular phone number, the voltage jumps from 48 volts DC to 90 volts AC on the incoming line, and the signal enters through telephone-line input jack 26. From there the signal enters the unit through capacitor 52, which acts as a current limit on the AC side of the rectifier bridge, which in turn changes the AC signal to DC. The signal then passes through resistor 54 which causes the voltage to drop, so that the 48 volts DC will not trigger the unit.

To protect against inverse voltage, a diode 56 is positioned between resistor 54 and opto-coupler 42. The opto-coupler is a two-phase device having an internal LED (light-emitting diode) 58 that lights when activated by the signal, whereby internal transistor 60 is turned on. This causes pin 4 of the opto-coupler to be grounded, thereby triggering the timing cycle 44.

Integrated circuit-timer chip 62 is activated in a non-triggerable monostable state, and is provided with constant 12-volts DC by means of a power supply defined by a 12-volt DC transformer 100 of the type adapted to be plugged into a typical 110-volt AC outlet 102, as illustrated in FIG. 1, the power supply being connected to timer chip 62 through input jack 63.

The cycle playing time is set by charging one of the selective variable resistors 64, 65, 66 or 67 by means of mode switch 68. Resistor 70 elevates pin 2 of timer chip 62 until triggered to ground by opto-coupler 42. Capacitor 72 is provided to stabilize the internal voltage-control oscillator of timer chip 62. The output of chip 62 (pin 3) is fed from current limit resistor 74 to base (npn) transistor 75. Transistor 75 then saturates and completes ground to timing relay 46, thus closing contacts 76 and 78 of relay switch 80, which is normally open. Hence, when relay switch 80 is closed the music circuit 48 is activated.

When the telephone is answered by lifting the receiver off from the cradle, the timing relay 46 and music circuit 48 are disconnected from each other by means of drop-out relay 50. That is, as the 90-volt AC signal, present on the line as the phone is ringing (playing a tune), it passes through diode 82 to change the voltage to DC. Resistor 84 limits current to its circuit. Diode 86 passes any voltage over 24-volts DC off to ground.

Resistor 88 is positioned so as to bleed off excess voltage, resulting in a voltage drop in drop-out relay 90. Drop-out relay 90 includes relay switch 92 which is a normally closed switch. Capacitor 94 within the drop-out relay circuit bleeds off any AC voltage remaining to ground, and the contacts 95 and 96 remain closed, completing the general circuit. Thus, when receiver 14 is lifted from its cradle, the line voltage drops to 6-volt DC which is too low to keep relay switch 92 closed. Hence, contacts 95 and 96 will open, causing the deactivation of timing relay 46 and music circuit 48, the music circuit being connected to relay switch 80.

When 12-volts DC from power supply 100 are applied to input jack 63, and the master power ("ON") switch 32 is closed, 12 volts are at that time present in lines A (positive) and B (negative), causing a light means 104 such as an LED to be illuminated. Resistor 105 acts as a current limit and voltage drop in the light-emitting diode 104, which lights to indicates that power is on. Diode 106 protects against inverse voltage and capacitor 108 bleeds off any excess AC voltage to ground (−).

There is provided a voltage regulator 110 which is adapted to regulate the output voltage to maintain it at 5-volts DC. Resistor 112 holds the base of transistor 114 to ground, thereby causing the transistor to remain open. Capacitor 116 is charged up through resistor 118, making the base of transistor 114 high, and causing it to saturate. This prevents the music circuit from replaying before the cycle has been completed for the given selective tune, without disconnecting the voltage at the power source.

The music circuit is provided with a plurality of tune selector switches 35, indicated individually from $S_1$ through $S_6$. These switches defined a means to program any one of numerous tunes or melodies. That is, by positioning each switch in a selected coded arrangement of (1) "up" or (0) "down", a given tune will play in place of the ringing bell. The musical-chip integrated circuit 120 (which is well known in the art) creates internally various frequency outputs that define predetermined musical notes. Output of integrated circuit 120 at pin 3 oscillates through resistor 122 (current limit resistor) to the base of transistor 124 which then oscillates through resistor 126 (current limit resistor) to the base of transistor 128 which creates tonal output (amplified) at speaker 130. Diode 132 directs current through the gate of transistor 128. Variable resistor 134 controls the volume output of speaker 130. Volume-control knob 135 is shown in FIG. 1.

The following are examples of various tunes and their assigned codes:

| TUNE | CODE | MODE |
| --- | --- | --- |
| America | 000000 | 1 |
| Anchors Aweigh | 000001 | 1 |
| Dixie | 000110 | 2 |
| Oh Susanna | 100100 | 2 |
| John Henry | 010110 | 3 |

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A musical-output adapter for telephones to be used in place of a ringing bell or in conjunction therewith, comprising:
    a first electronic circuit adapted to be operably coupled to the incoming signal of a telephone line, said first electronic circuit including:
        means to convert alternating current into direct current coming from said incoming signal,
        an opto-coupler connected to said means to convert alternating current into direct current, whereby direct current is fed to said opto-coupler,
        a timing circuit connected to said opto-coupler from which current is passed to activate said timing circuit,
        a timing relay connected to said timing circuit, said timing relay being actuated by said timing circuit; and
    a second electronic circuit defining a music circuit connected to said timing relay, said music circuit being activated when said timing relay is closed;
    a DC power supply coupled to said timing relay to allow DC voltage to continuously activate said music circuit when said relay is closed;
    a speaker means connected to said music circuit, whereby music is received from said music circuit when said music circuit is activated; and
    a drop-out-relay circuit connected and responsive to said incoming signal of said telephone line to activate said drop-out-relay circuit so as to provide a normally closed mode, said drop-out relay circuit being further interconnected between said timing circuit and said timing relay, whereby said music circuit is controlled.

2. A musical-output adapter as recited in claim 1, wherein said means to convert alternating current into direct current comprises a rectifier bridge, and wherein said opto-coupler establishes a means for optically coupling the DC-voltage output of said rectifier bridge to operate said first electronic circuit.

3. A musical-output adapter as recited in claim 2, wherein said first electronic circuit is not activated until said incoming signal is changed to a ringing-mode signal of an incoming call, whereby said ringing-mode signal has a greater voltage than said incoming signal.

4. A musical-output adapter as recited in claim 3, wherein said musical circuit when activated is powered by said DC power supply, and wherein said musical circuit includes:
    a digital, programmable, sound-synthesizer means which is programmed to provide a multiplicity of tunes or melodies; and
    means for preselecting any one of said programmed tunes or melodies.

5. A musical-output adapter as recited in claim 4, wherein said timing circuit includes a non-triggerable, monostable state, integrated-circuit timer provided with a constant voltage from said DC power supply.

6. A musical-output adapted as recited in claim 5, wherein said timing circuit further includes a mode-switching means to provide a cycle-playing time for said preselective tune or melody.

7. A musical-output adapter as recited in claim 6, wherein said adapter includes a master power ("ON") switch and a light-indicating means.

8. A musical-output adapter as recited in claim 6, wherein said preselecting means comprises a plurality of selector switches which are selectively positioned by means of a given code arrangement assigned to each tune or melody.

9. A musical-output adapter as recited in claim 8, wherein said sound-synthesizer means comprises an integrated musical-chip circuit adapted to create various internal frequency outputs that define predetermined musical notes.

10. A musical-output adapter as recited in claim 9, wherein said adapter includes a volume-control means to control the volume output of said speaker.

11. A musical-output adapter as recited in claim 10, including means to selectively disconnect the operation of the bell of said telephone.

* * * * *